(12) United States Patent
Lee et al.

(10) Patent No.: US 7,194,152 B2
(45) Date of Patent: Mar. 20, 2007

(54) MICRO MIRROR AND METHOD OF MANUFACTURING THE SAME

(75) Inventors: Myung-bok Lee, Suwon-si (KR); Jin-seung Sohn, Seoul (KR); Eun-hyoung Cho, Seoul (KR); Hae-sung Kim, Hwaseong-si (KR)

(73) Assignee: Samsung Electro-Mechanics Co., Ltd., Gyeonggi-do (KR)

( * ) Notice: Subject to any disclaimer, the term of this patent is extended or adjusted under 35 U.S.C. 154(b) by 0 days.

(21) Appl. No.: 11/203,375

(22) Filed: Aug. 15, 2005

(65) Prior Publication Data

US 2006/0072870 A1    Apr. 6, 2006

(30) Foreign Application Priority Data

Oct. 5, 2004    (KR) ............. 10-2004-0079201

(51) Int. Cl.
    *G02B 6/12*    (2006.01)
(52) U.S. Cl. ........................ 385/14; 385/147
(58) Field of Classification Search ............ 385/14, 385/147
    See application file for complete search history.

(56) References Cited

U.S. PATENT DOCUMENTS

2004/0240779 A1* 12/2004 Yeh et al. .................. 385/19

FOREIGN PATENT DOCUMENTS

| KR | 10-0351561 B1 | 9/2002 |
| KR | 2003-0028398 A | 4/2003 |

* cited by examiner

*Primary Examiner*—Kevin S. Wood
(74) *Attorney, Agent, or Firm*—Sughrue Mion, PLLC

(57) ABSTRACT

A micro mirror and a method of manufacturing the same are provided. The micro mirror includes a silicon substrate having a first slant plane and a second slant plane that face each other, and a clad layer including a first mirror surface and a second mirror surface respectively formed on the first slant plane and the second slant plane, wherein the clad layer reflects light.

11 Claims, 8 Drawing Sheets

MICRO MIRROR AND METHOD OF MANUFACTURING THE SAME

CROSS-REFERENCE TO RELATED APPLICATION

This application claims the priority of Korean Patent Application No. 10-2004-0079201, filed on Oct. 5, 2004, in the Korean Intellectual Property Office, the disclosure of which is incorporated herein in its entirety by reference.

BACKGROUND OF THE INVENTION

1. Field of the Invention

The present invention relates to a micro mirror and a method of manufacturing the same, and more particularly, to a micro mirror having a reflecting plane with an accurate angle and shape and a method of manufacturing the same by coating the reflecting plane of a micro mirror formed by isotropic wet etching of silicon with a polymer and pressing the polymer using a mold with a predetermined angle and shape accuracy.

2. Description of the Related Art

Micro mirrors can be used for optical pickups, optical communication systems, optical information processing systems, etc. An optical data storage device using an optical pickup records/reproduces information to/from an optical disc. Optical discs are distinguished from other data storage devices by the advantages of ease of distribution, portability, high capacity, copy protection, etc.

To achieve a high recording density by collecting optical energy to a small spot, an optical data storage device recording and reproducing data to and from an optical disc has been developed for a decreased wavelength of a light source and an increased numerical aperture (NA) of an objective lens. For example, an optical data storage device for a compact disc (CD) uses a light source having a wavelength of 780 nm and an objective lens having an NA of 0.45, and an optical data storage device for a digital versatile disc (DVD) uses a light source having a wavelength of 650 nm and an objective lens having an NA of 0.6.

Recently, with the trend of adapting an optical disc for a portable information device, a micro optical pickup has been under active development. Conventionally, to miniaturize an optical pickup and an optical data storage device using the same, the entire volume of an optical system is usually reduced by decreasing the size of optical elements. However, this size reduction has a technological limit. Considering this limit, there has been an attempt to use semiconductor manufacturing processes to manufacture optical pickups. Conventionally, when optical elements that are several millimeters in size are assembled, a large amount of time is needed to individually adjust the optical elements to an optical axis. Therefore, the automation rate of the optical elements is low. However, when optical pickups are manufactured using semiconductor processes, they can be manufactured at a wafer level, and therefore, mass production is possible. In addition, this method facilitates miniaturization, assembly, and adjustment of the optical elements.

FIGS. 1A through 1D are sectional views of stages in a method of manufacturing a micro mirror using semiconductor processes, which is disclosed in U.S. Patent Publication No. 2001/0048548.

Referring to FIG. 1A, a silicon wafer 10 is prepared by cutting a silicon ingot 9.74° off-axis with respect to a <111> direction from a (100) plane, using Miller indices. The silicon wafer 10 has a thickness of about 500 μm. Etch masks 21 and 22 are formed on opposite sides of the silicon wafer 10.

Referring to FIG. 1B, an etch window 23 is formed in the etch mask 21 on a front surface of the silicon wafer 10 using photolithography.

Referring to FIG. 1C, wet etching is performed by putting the silicon wafer 10 with the etch window 23 in an isotropic silicon etchant such as KOH or TMAH maintained at an appropriate temperature. After a predetermined period of time of the wet etching, planes respectively having slant angles of 45° and 64.48° with respect to a bottom surface of the silicon wafer 10 are formed. Reference numeral 12 denotes one plane of four (111) crystal planes appearing when etching is stopped.

Referring to FIG. 1D, after removing the etch masks 21 and 22, the silicon wafer 10 is cut to use a 45-degree slant plane 11.

The above-described micro mirror can be manufactured at a wafer level, and satisfactory plane accuracy can be obtained when a light source having a long wavelength is used or an etch depth of the optical elements is low. However, when an etch depth is greater than several hundreds of micrometers, it is difficult to lower a surface shape accuracy below λ/6, which is usually required for optical elements of an optical pickup, for example, below about 70 nm in a blue-ray optical disc using a short wavelength of 405 nm, with the conventional method of manufacturing a micro mirror. To manufacture a high precision mirror, a high-quality silicon wafer that is cut toward an accurate crystal direction and has an extremely low impurity concentration should be used. Moreover, since etching conditions such as the concentration, temperature, and agitation of an etchant and an etching apparatus must be precisely controlled, manufacturing cost naturally increases.

SUMMARY OF THE INVENTION

The present invention provides a micro mirror having an accurate mirror surface obtained by forming a polymer as a clad layer on a slant plane of an initially etched silicon substrate and a method of manufacturing the micro mirror at a wafer level.

According to an aspect of the present invention, there is provided a micro mirror including a silicon substrate having a first slant plane and a second slant plane that face each other; and a clad layer including a first mirror surface and a second mirror surface respectively formed on the first slant plane and the second slant plane, wherein the clad layer reflects light.

The clad layer may be formed using an ultraviolet-cured polymer, a thermoset polymer, or a thermoplastic polymer.

The first and second slant planes may have a slant angle of 54.74° with respect to a bottom surface of the silicon wafer.

Alternatively, the first and second slant planes may respectively have slant angles of 45° and 64.48° with respect to a bottom surface of the silicon wafer.

At least one of the first and second mirror surfaces may have a slant angle of 45° with respect to a bottom surface of the silicon wafer.

According to another aspect of the present invention, there is provided a method of manufacturing a micro mirror, including forming a first mask and a second mask on front and rear surfaces, respectively, of a silicon wafer; forming an etch window exposing a predetermined area of the silicon wafer by patterning the first mask; forming slant planes facing each other by wet-etching the silicon wafer through the etch window; forming a polymer layer on the silicon wafer by performing spin coating; forming a clad layer including mirror surfaces that face each other and respectively correspond to the slant planes by inserting a mold attached to a substrate through the etch window and pressurizing the polymer layer; removing the mold from the silicon wafer; and dicing the silicon wafer to form individual micro mirrors.

The silicon wafer may have a (100) plane, the slant planes may have a slant angle of 54.74° with respect to a bottom surface of the silicon wafer, and the mirror surfaces may have a slant angle of 45° with respect to the bottom surface of the silicon wafer.

Alternatively, the silicon wafer may have a (100) plane and may be off-axis by 9.74° in a <111> direction, and the slant planes may respectively have slant angles of 45° and 64.48° with respect to a bottom surface of the silicon wafer.

The polymer layer may be formed using an ultraviolet-cured polymer, the mold and the substrate may be formed using a light-transmitting material, and the forming of the clad layer may include hardening the polymer layer by radiating ultraviolet rays at the silicon substrate from above.

Alternatively, the polymer layer may be formed using one of a thermoset polymer and a thermoplastic polymer, and the forming of the clad layer may include hardening the polymer layer by heating it.

The forming of the slant planes may include removing the first and second masks and disposing a plate on the rear surface of the silicon wafer, and the removing of the mold may include removing the polymer layer attached to the plate by removing the plate from the silicon wafer, thereby forming a hole between the mirror surfaces.

According to another aspect of the present invention, a plurality of micro mirrors may be formed on a wafer, and therefore, a large number of micro mirrors can be produced at low cost by dicing the wafer.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EXEMPLARY EMBODIMENTS

Figure 1A:
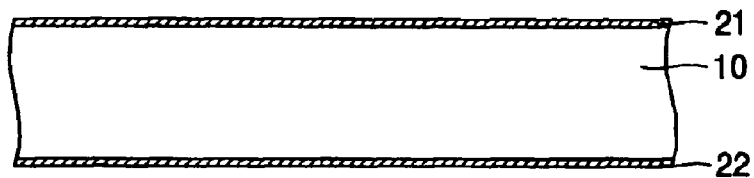
FIGS. 1A through 1D are sectional views of stages in a conventional method of manufacturing a micro mirror.
Figure 1B:
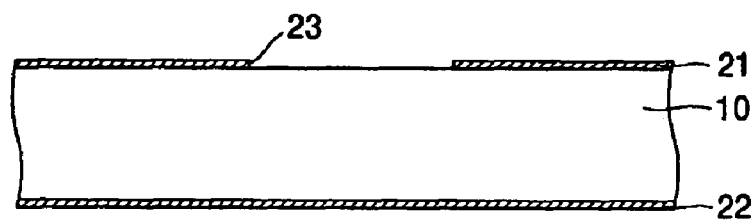
Figure 1C:
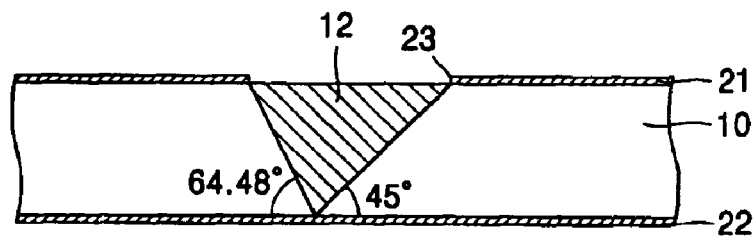
Figure 1D:
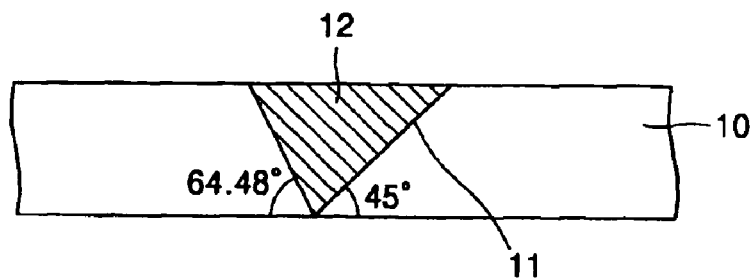

Hereinafter, exemplary embodiments of the present invention will be described in detail with reference to the attached drawings, wherein like reference numerals refer to the like elements throughout.

Figure 2:
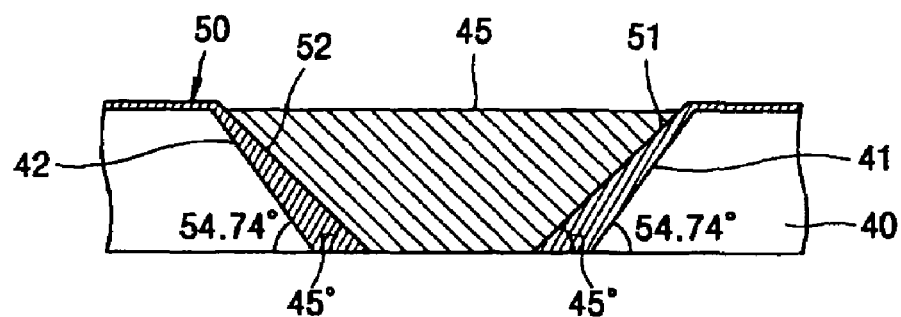
FIG. 2 is a sectional view of a micro mirror according to a first exemplary embodiment of the present invention.

FIG. 2 is a sectional view of a micro mirror according to a first exemplary embodiment of the present invention. A silicon substrate 40 with a (100) plane is wet-etched, thereby forming a first slant plane 41 and a second slant plane 42 that face each other and have a slant angle of 54.74°. Reference numeral 45 denotes one of four (111) crystal planes appearing at the stop of etching. A clad layer 50 is formed so that a first mirror surface 51 and a second mirror surface 52 are respectively formed on the first slant plane 41 and the second slant plane 42. The plane 45 may be coated with the same material as that of the clad layer 50.

The first and second mirror surfaces 51 and 52 are tilted at an angle of 45° with respect to a bottom surface of the silicon substrate 40. The clad layer 50 may be formed using an ultraviolet (UV)-cured polymer, a thermoset polymer, or a thermoplastic polymer.

Figure 3:
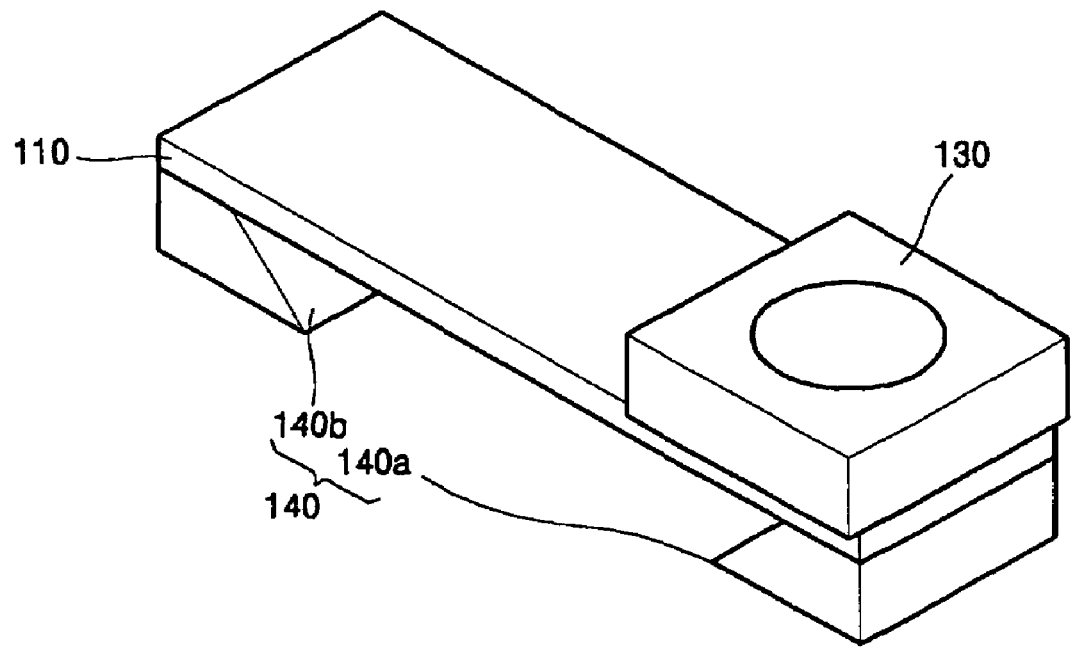
FIGS. 3 and 4 are diagrams of an optical pickup using a micro mirror of an exemplary embodiment of the present invention.
Figure 4:
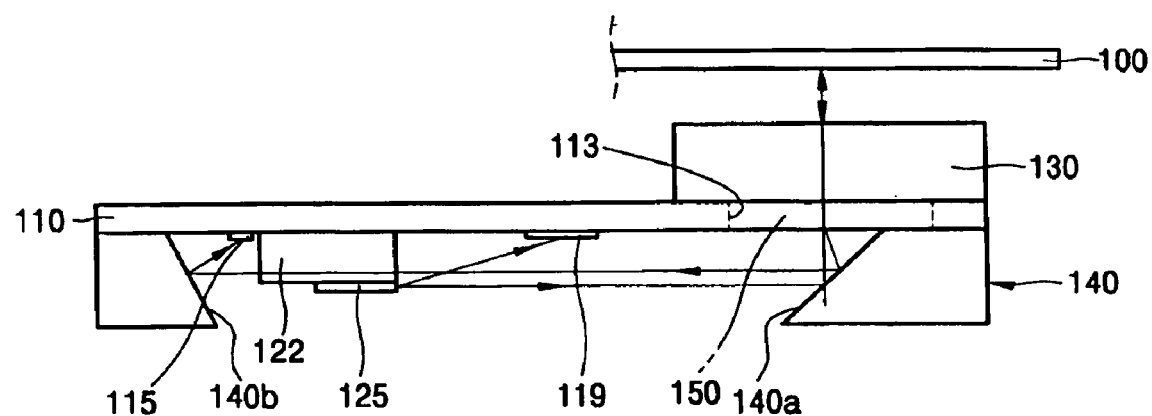

FIGS. 3 and 4 are diagrams of an optical pickup using a micro mirror of the present invention. Referring to FIGS. 3 and 4, the optical pickup includes an optical bench 110 having a plate shape, a diced mount 122 positioned on the optical bench 110, and a light source 125 installed on the mount 122. In addition, the optical pickup further includes a lens unit 130, a mirror unit 140, and an optical path splitting unit 150.

A light through-hole 113 is formed in the optical bench 110 to allow light from the light source 125 to pass. The light emitted from the light source 125 passes through the light through-hole 113 in the optical bench 110 and is incident onto a data storage medium 100. Then, the light is reflected from the data storage medium 100, then passes through the light through-hole 113, and is then incident onto a first mirror 140a.

A main photodetector 115 and a monitor photodetector 119 are disposed on one side of the optical bench 110. The monitor photodetector 119 directly receives a portion of the light emitted from the light source 125 and generates a monitoring signal indicating the quantity of the light from the light source 125. The main photodetector 115 receives the light reflected from the data storage medium 100 and detects a data reproducing signal (i.e., a radio frequency (RF) signal) and at least one error signal (e.g., a focus error signal, a tracking error signal, and/or a tilt error signal) used for servo driving.

The lens unit 130 collects the light emitted from the light source 125 and forms a light spot on the data storage medium 100. The lens unit 130 may be a refractive lens, a diffractive lens, or a GRIN lens.

The mirror unit 140 includes the first mirror 140a that is disposed at an end of the optical bench 110 to reflect the light from the light source 125 through the light through-hole 113 and onto the data storage medium 100 and a second mirror 140b that is disposed at an opposite end of the optical bench 110 to reflect the light, which has been sequentially reflected from the data storage medium 100 and the first mirror 140a, onto the main photodetector 115. The mirror unit 140 including the first and second mirrors 140a and 140b may be replaced by the micro mirror according to the first exemplary embodiment.

The light path splitting unit 150 separates a path of the light that is emitted from the light source and is incident onto the data storage medium 100 from a path of the light that is reflected from the data storage medium 100. For example, the light path splitting unit 150 may include an optical element, e.g., a hologram optical element (HOE) or a diffractive optical element (DOE). In detail, the light path splitting unit 150 splits the light path by transmits the light from the light source 125 to go straight to the data storage medium 100 and diffracting the light reflected from the data storage medium 100. As a result, the light reflected from the data storage medium 100 and diffracted by the light path splitting unit 150 is incident onto the first mirror 140a obliquely to the light proceeding toward the data storage medium 100 and is sequentially reflected from the first and second mirrors 140a and 140b to the main photodetector 115.

Figure 5:
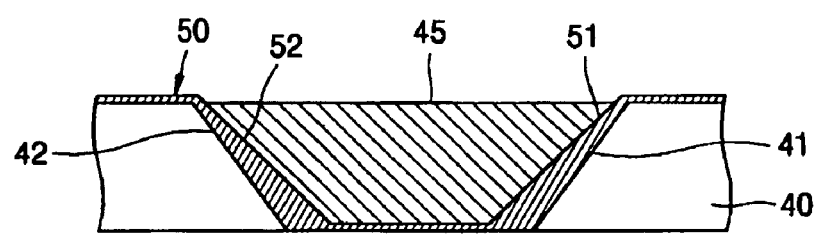
FIG. 5 is a sectional view of a modification of the micro mirror shown in FIG. 2.

FIG. 5 is a sectional view of a modification of the micro mirror shown in FIG. 2. Detailed descriptions of the same elements as those shown in FIG. 2 will be omitted. Referring to FIG. 5, a bottom surface of the silicon substrate 40 between the first mirror surface 51 and the second mirror surface 52 is covered with the clad layer 50. The clad layer 50 on the bottom is formed when the first mirror surface 51 and the second mirror surface 52 are formed using spin coating and can protect an optical pickup from external dusts when the micro mirror is used in the optical pickup.

Figure 6:
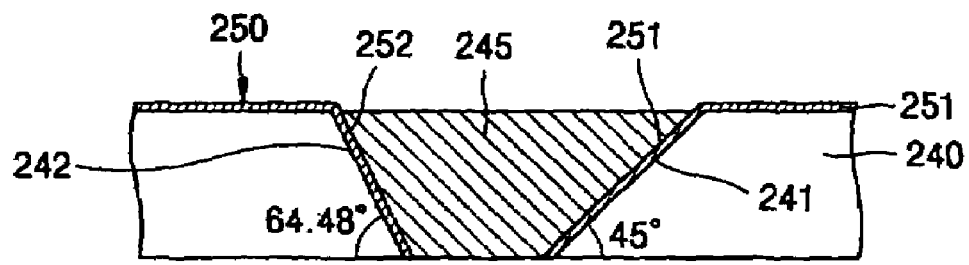
FIG. 6 is a sectional view of a micro mirror according to a second exemplary embodiment of the present invention.

FIG. 6 is a sectional view of a micro mirror according to a second exemplary embodiment of the present invention. A silicon substrate 240 is cut 9.74° off-axis with respect to a <111> direction from a (100) plane and wet-etched, thereby forming a first slant plane 241 and a second slant plane 242 that face each other and respectively have slant angles of 45° and 64.48°. Reference numeral 245 denotes one of four (111) crystal planes appearing at the stop of etching. A clad layer 250 is formed so that a first mirror surface 251 and a second mirror surface 252 are respectively formed on the first slant plane 241 and the second slant plane 242. The plane 245 may be coated with the same material as that of the clad layer 250.

The first and second mirror surfaces 251 and 252 are respectively tilted at angles of 45° and 64.48° with respect to a bottom surface of the silicon substrate 240. The clad layer 250 may be formed using a UV-cured polymer, a thermoset polymer, or a thermoplastic polymer.

Hereinafter, exemplary embodiments of a method of manufacturing a large amount of micro mirrors at a wafer level will be described with reference to the attached drawings.

Figure 7:
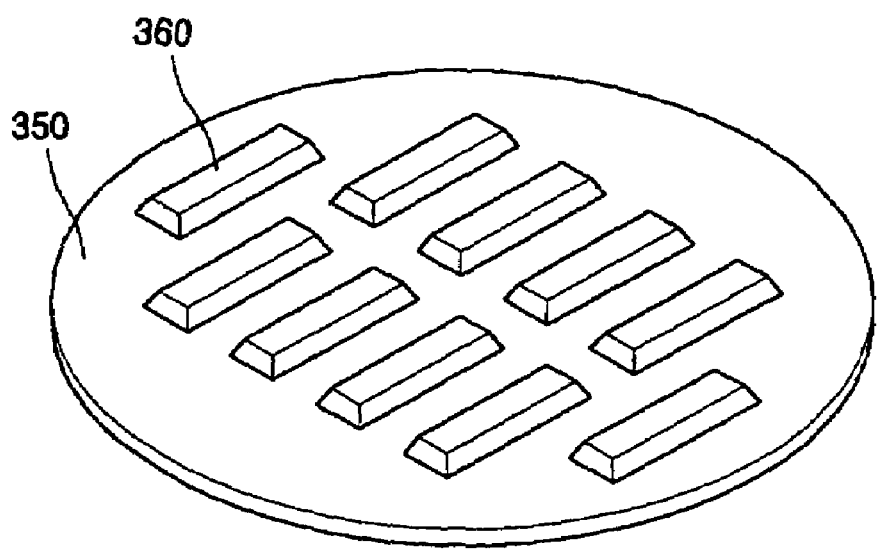
FIG. 7 illustrates a mold used to manufacture a micro mirror according to a third exemplary embodiment of the present invention.

FIG. 7 illustrates a mold used to manufacture a micro mirror according to embodiments of the present invention. Molds 360 are arranged and attached to a substrate 350. Each mold 360 has slant planes with the same slant angles as mirror surfaces of a micro mirror to be manufactured at its opposite sides. The slant angles may be 45° or 45° and 64.48°. The substrate 350 and the molds 360 may be formed using glass, silicon, hard metal, metal, or the like.

Figure 8A:
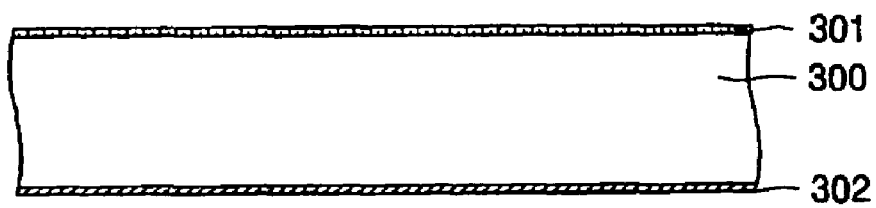
FIGS. 8A through 8F are sectional views of stages in a method of manufacturing the micro mirror according to the third exemplary embodiment of the present invention.

FIGS. 8A through 8F are sectional views of stages in a method of manufacturing a micro mirror according to a third embodiment of the present invention. Referring to FIG. 8A, a silicon wafer 300 is prepared by cutting a silicon ingot 9.74° off-axis with respect to a <111> direction from a (100) plane. The silicon wafer 300 may have a thickness of about 500 μm. Etch masks 301 and 302 are formed on opposite sides of the silicon wafer 300. The etch masks 301 and 302 may be formed using silicon oxide or silicon nitride.

Figure 8B:
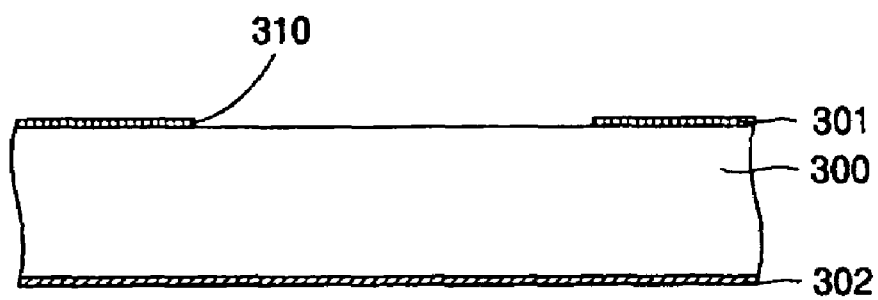

Referring to FIG. 8B, an etch window 310 having a rectangular shape is formed in the etch mask 301 on a front surface of the silicon wafer 300 using a photolithography technique.

Figure 8C:
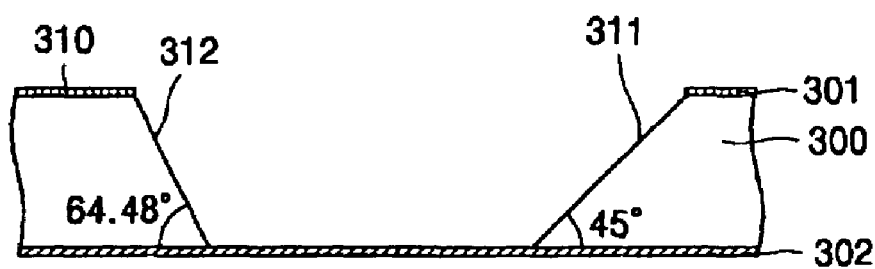

Referring to FIG. 8C, wet etching is performed by putting the silicon wafer 300 with the etch window 310 in an isotropic silicon etchant such as KOH or TMAH maintained at an appropriate temperature. After a predetermined period of time of the wet etching, slant planes 311 and 312 respectively having slant angles of 45° and 64.48° with respect to a bottom surface of the silicon wafer 300 are formed through the etch window 310. Although not shown, a plane viewed from the front is one of four (111) crystal planes appearing at the stop of etching.

Figure 8D:
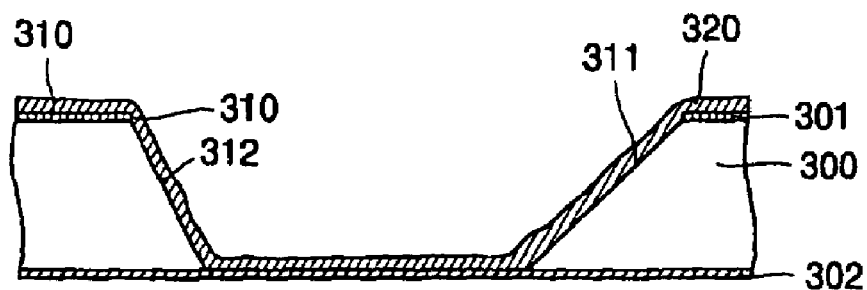

Referring to FIG. 8D, a clad layer 320 is formed on the silicon wafer 300. The clad layer 320 may be formed by performing spin coating using a polymer, e.g., a UV-cured polymer.

Figure 8E:
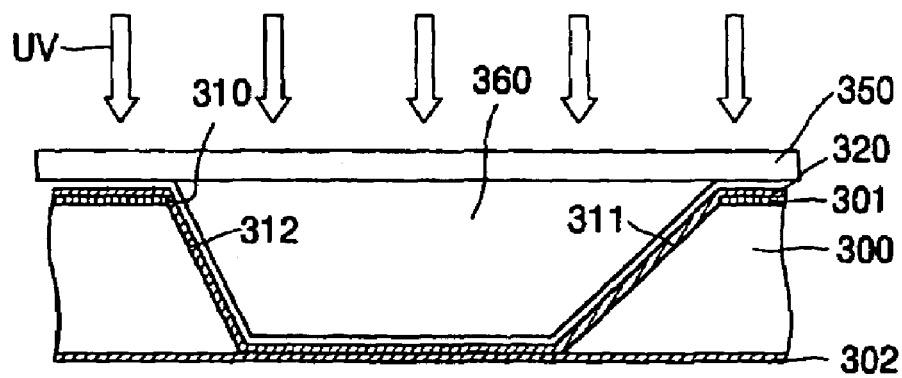

Referring to FIG. 8E, the substrate 350 with the plurality of the molds 360 is aligned with the silicon wafer 300 such that each mold 360 corresponds to an etched area in the silicon wafer 300 and is pressurized when the mold 360 is inserted into the corresponding etched area. Here, angles of the slant planes of the mold 360 are identical with those of the slant planes 311 and 312. Subsequently, UV rays are radiated from above and thereby harden the UV-cured polymer.

Figure 8F:
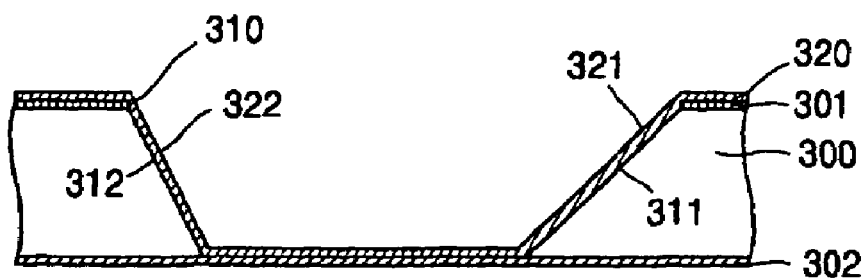

Referring to FIG. 8F, the substrate 350 with the molds 360 is removed from the silicon wafer 300. Next, the etch mask 302 is removed. Then, two mirror surfaces 321 and 322 respectively having slant angles of 45° and 64.48° are formed on the slant planes 311 and 312, respectively. As a result, a plurality of micro mirrors having the mirror surfaces 321 and 322 facing each other are formed in the silicon wafer 300. When the silicon wafer 300 is diced, a large number of micro mirrors can be produced. According to a dicing position, one or two planes (45 shown in FIG. 2) may be present between the mirror surfaces 321 and 322 or the two mirror surfaces 321 and 322 may be independently separated from each other. In addition, dicing may be performed after the silicon wafer 300 with the micro mirrors is bonded to a wafer with optical elements, thereby producing individual optical elements.

Figure 9A:
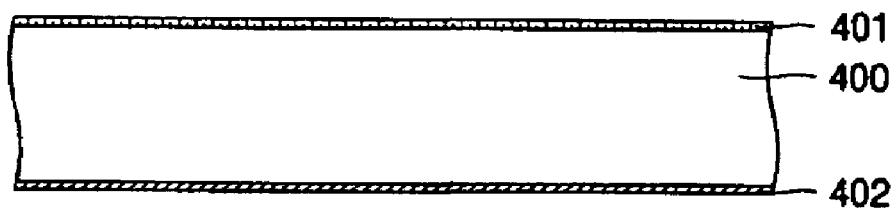
FIGS. 9A through 9F are sectional views of stages in a method of manufacturing a micro mirror according to a fourth exemplary embodiment of the present invention.

FIGS. 9A through 9F are sectional views of stages in a method of manufacturing a micro mirror according to a fourth embodiment of the present invention. Referring to FIG. 9A, a silicon wafer 400 is prepared by cutting a silicon ingot along a (100) plane. The silicon wafer 400 may have a thickness of about 500 μm. Etch masks 401 and 402 are formed on opposite sides of the silicon wafer 400. The etch masks 401 and 402 may be formed using silicon oxide or silicon nitride.

Figure 9B:
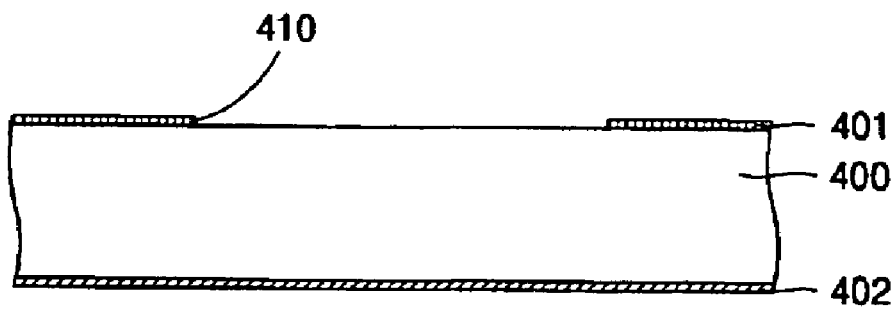

Referring to FIG. 9B, an etch window 410 having a rectangular shape is formed in the etch mask 401 on a front surface of the silicon wafer 400 using a photolithography technique.

Figure 9C:
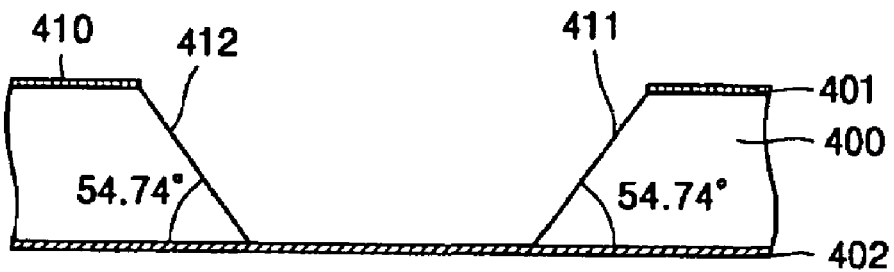

Referring to FIG. 9C, wet etching is performed by putting the silicon wafer 400 with the etch window 410 in an isotropic silicon etchant such as KOH or TMAH maintained at an appropriate temperature. After a predetermined period of time of the wet etching, slant planes 411 and 412 having a slant angle of 54.74° with respect to a bottom surface of the silicon wafer 400 are formed through the etch window 410. Although not shown, a plane viewed from the front is one of four (100) crystal planes appearing at the stop of etching. Subsequently, the etch masks 401 and 402 are removed.

Figure 9D:
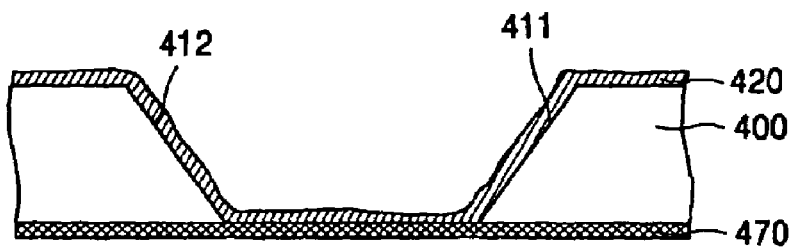

Referring to FIG. 9D, a plate 470 is disposed on a rear surface of the silicon wafer 400. A clad layer 420 is formed on the silicon wafer 400. The clad layer 420 may be formed by performing spin coating using a polymer, e.g., a thermoset polymer. The thermoset polymer may be a phenol resin or an epoxy resin.

Figure 9E:
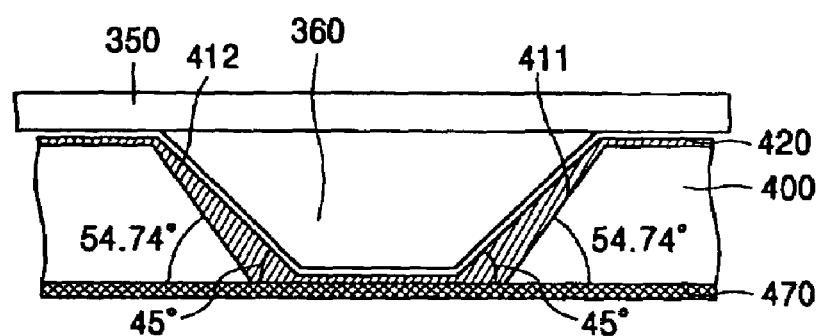

Referring to FIG. 9E, the substrate 350 with the plurality of the molds 360 is aligned with the silicon wafer 400 such that each mold 360 corresponds to an etched area in the silicon wafer 400 and is pressurized when the mold 360 is inserted into the corresponding etched area. Here, the mold 360 may form a plane having a slant angle of 45° on each of the slant planes 411 and 412. Subsequently, the clad layer 420 is heated and thereby hardened.

Figure 9F:
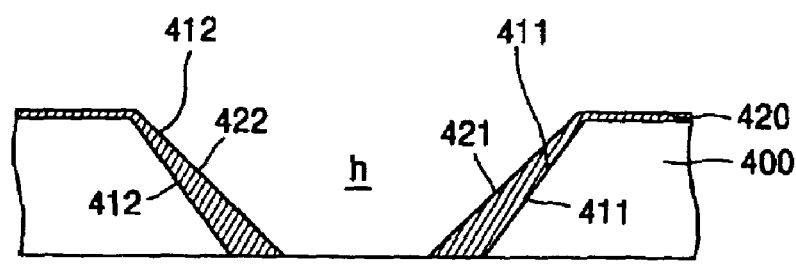

Referring to FIG. 9F, the substrate 350 with the molds 360 and the plate 470 are removed from the silicon wafer 400. Then, two mirror surfaces 421 and 422 having a slant angle of 45° are formed on the slant planes 411 and 412, respectively, and a hole "h" is formed between the mirror surfaces 421 and 422. As a result, a plurality of micro mirrors having the mirror surfaces 421 and 422 facing each other are formed in the silicon wafer 400. When the silicon wafer 400 is diced, a large number of micro mirrors can be produced.

In the fourth exemplary embodiment of the present invention, the thermoset polymer is used, but the present invention is not restricted thereto. For example, powder of a thermoplastic polymer instead of the thermoset polymer may be applied on a silicon wafer and then heat-treated to manufacture a micro mirror. When the thermoset polymer or the thermoplastic polymer is used, transparent mold and substrate may not be used.

According to exemplary embodiments of the present invention, a micro mirror has a clad layer with a mirror surface having a predetermined slant angle on a slant plane of an etched silicon substrate. Since the surface shape accuracy of the mirror surface increases due to the accuracy of a mold, exemplary embodiments of the present invention can be used for optical pickups using a high precision micro mirror. In addition, according to exemplary embodiments of the present invention, a large number of micro mirrors can be produced at low cost by manufacturing the micro mirrors at a wafer level.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A micro mirror comprising:
    a silicon substrate having a first slant plane and a second slant plane that face each other; and
    a clad layer comprising a first mirror surface and a second mirror surface respectively formed on the first slant plane and the second slant plane,
    wherein the clad layer reflects light,
    wherein the clad layer is formed using one selected from the group consisting of an ultraviolet-cured polymer, a thermoset polymer, and a thermoplastic polymer.

2. The micro mirror of claim 1, wherein the first and second slant planes have a slant angle of 54.74° with respect to a bottom surface of the silicon wafer.

3. The micro mirror of claim 1, wherein the first and second slant planes respectively have slant angles of 45° and 64.48° with respect to a bottom surface of the silicon wafer.

4. The micro mirror of claim 1, wherein at least one of the first and second mirror surfaces has a slant angle of 45° with respect to a bottom surface of the silicon wafer.

5. A method of manufacturing a micro mirror, comprising:
    forming a first mask and a second mask on front and rear surfaces, respectively, of a silicon wafer;
    forming an etch window exposing a predetermined area of the silicon wafer by patterning the first mask;
    forming slant planes facing each other by wet-etching the silicon wafer through the etch window;
    forming a polymer layer on the silicon wafer by performing spin coating;
    forming a clad layer comprising mirror surfaces that face each other and respectively correspond to the slant planes by inserting a mold attached to a substrate through the etch window and pressurizing the polymer layer;
    removing the mold from the silicon wafer; and
    dicing the silicon wafer to form individual micro mirrors.

6. The method of claim 5, wherein the silicon wafer has a (100) plane, the slant planes have a slant angle of 54.74° with respect to a bottom surface of the silicon wafer, and the mirror surfaces have a slant angle of 45° with respect to the bottom surface of the silicon wafer.

7. The method of claim 5, wherein the silicon wafer has a (100) plane and is off-axis by 9.74° in a <111> direction, and the slant planes respectively have slant angles of 45° and 64.48° with respect to a bottom surface of the silicon wafer.

8. The method of claim 7, wherein the mold has slants fitting with the slant planes, respectively, and the mirror surfaces respectively have slant angles of 45° and 64.48° with respect to the bottom surface of the silicon wafer.

9. The method of claim 5, wherein the polymer layer is formed using an ultraviolet-cured polymer,
    the mold and the substrate are formed using a light-transmitting material, and
    the forming of the clad layer comprises hardening the polymer layer by radiating ultraviolet rays at the silicon substrate from above.

10. The method of claim 5, wherein the polymer layer is formed using one of a thermoset polymer and a thermoplastic polymer, and
    the forming of the clad layer comprises hardening the polymer layer by heating it.

11. The method of claim 5, wherein the forming of the slant planes comprises removing the first and second masks and disposing a plate on the rear surface of the silicon wafer, and
    the removing of the mold comprises removing the polymer layer attached to the plate by removing the plate from the silicon wafer, thereby forming a hole between the mirror surfaces.

* * * * *